United States Patent [19]
Hashimoto

[11] Patent Number: 5,858,301
[45] Date of Patent: Jan. 12, 1999

[54] VALVE GATE-TYPE INJECTION MOLDING METHOD AND APPARATUS THEREFOR

[75] Inventor: Noritsugu Hashimoto, Takaoka, Japan

[73] Assignee: Takaoka Seiko Co., Ltd., Takaoka, Japan

[21] Appl. No.: 860,513

[22] PCT Filed: Oct. 31, 1995

[86] PCT No.: PCT/JP95/02226

§ 371 Date: Jun. 27, 1997

§ 102(e) Date: Jun. 27, 1997

[87] PCT Pub. No.: WO97/16293

PCT Pub. Date: May 9, 1997

[51] Int. Cl.⁶ ................................................. B29C 49/04
[52] U.S. Cl. .................... 264/531; 264/540; 264/539; 425/532; 425/533
[58] Field of Search ....................... 264/539, 537, 264/531, 540; 425/532, 533

[56] References Cited

U.S. PATENT DOCUMENTS

| | | | |
|---|---|---|---|
| 3,162,706 | 12/1964 | Cheney | 264/539 |
| 3,278,666 | 10/1966 | Donald | 264/540 |
| 3,329,996 | 7/1967 | Marcus et al. | 264/539 |
| 3,733,309 | 5/1973 | Wyeth et al. | 264/539 |
| 5,242,653 | 9/1993 | Olle | 264/539 |
| 5,308,574 | 5/1994 | Yamazaki et al. | |

FOREIGN PATENT DOCUMENTS 692590   6/1953   United Kingdom .................. 264/537

OTHER PUBLICATIONS

International Search Report in PCT/JP5/02226 mailed Feb. 6, 1996.

*Primary Examiner*—Catherine Timm
*Attorney, Agent, or Firm*—Varndell Legal Group

[57] ABSTRACT

A valve pin (4) for controlling an injection amount of molten resin is inserted into a cavity (13), and then the molten resin is injected by way of a gate (10) along the surface of the valve pin (4) into the cavity (13) to be dropped therein, and tip ends of this dropping molten resin merges at a bottom (13a) of the cavity (13) to form a hollow portion (S) between the valve pin (4) and the dropped molten resin. Then, air is blown into the hollow portion (S) from the tip end of the valve pin (4), inflates the hollow portion (S), brings it into contact with the inner surface of the cavity (13), and cools and solidifies this molten resin, so as to attain a hollow molded product (40).

7 Claims, 9 Drawing Sheets

VALVE GATE-TYPE INJECTION MOLDING METHOD AND APPARATUS THEREFOR

TECHNICAL FIELD

The present invention relates to an improvement of a valve gate-type injection molding method and apparatus, wherein molten synthetic resin such as plastic is injected into a closed mold and then the mold is opened to take out a cooled and solidified product, thereby to attain a molded product which is the target product, and particularly to a valve gate-type injection molding method and apparatus for attaining a molded product having a hollow portion formed inside.

BACKGROUND ART

Before now, various types of injection molding methods and apparatuses have been proposed as injection molding methods and apparatuses to attain comparatively precise molded products from synthetic resin, such as plastic.

In particular, in recent years, an injection molding method and apparatus of valve gate type, has been proposed as one of the injection molding methods and apparatuses, in order to reduce the molding cycle time for a molded product.

This valve gate-type injection molding method and apparatus comprises a valve for temporarily holding molten resin to which prepressure is applied, and a valve pin extendably and retractably placed within the valve, wherein by releasing a gate formed in the mold by the valve pin, molten resin, to which prepressure was applied, fills the cavity in the mold at a high speed, and the gate is closed again by the valve pin after the filling of the molten resin.

This type of valve gate-type injection molding method and apparatus has the effect of eliminating the time wasted by the compression of the molten resin before its injection, and therefore shortening the molding cycle time for a molded product, because molten resin within the valve is compressed in advance during the opening of the mold to take out the molded product.

In the case of molding a molded product having a hollow portion with the conventional valve gate-type injection molding method and apparatus discussed above, a large number of mold parts having complex forms are prepared in the portion of the mold for forming the hollow portion, in view of releasing that portion of the mold, and an operation of removing the large number of mold parts having complex forms in a proper order is performed when removing a molded product having a hollow portion from the mold.

For this reason, in the case of molding a molded product having a hollow portion with the conventional valve gate-type injection molding method and apparatus discussed above, disadvantages are that the parts of the mold are complex and great in number, and therefore costs for producing the entire valve gate-type injection molding apparatus is increased, and also efficiency for producing hollow molded products is lowered due to the complex releasing operation for the hollow portion.

Moreover, in the case of molding a hollow product, such as a bottle with a small mouth, it is impossible to release the portion of the mold for forming the hollow portion. Therefore, conventional valve gate-type injection molding methods and apparatuses cannot be used to form a hollow molded product of such a type as a bottle with a small mouth.

With the foregoing in view, it is an object of the present invention to provide a valve gate-type injection molding method and apparatus capable of improving as much as possible the production efficiency for a hollow molded product, while reducing the number of parts of the entire apparatus and the number of manufacturing processes.

DISCLOSURE OF THE INVENTION

The present invention is constituted to attain a hollow molded product by inserting a valve pin, which controls the quantity of molten resin injected from a valve, inside a cavity; then injecting molten resin by way of a gate and along the surface of the valve pin so as to drop the molten resin into the cavity; joining together the tip end of this dropping molten resin at the bottom portion of the cavity, causing a hollow portion to be formed between the valve pin and the dropped molten resin; and then blowing air into the hollow portion from the tip end of the valve pin to expand this hollow portion so as to bring it to contact with the inner surface of the cavity.

With this type of valve gate-type injection molding method and apparatus, only a mold to form the exterior of a hollow molded product is needed in order to form a hollow molded product and another mold dedicated to form a hollow portion is not necessary. Therefore, the number of the parts for the entire valve gate-type injection molding apparatus can be reduced and a release operation for the mold dedicated to the formation of a hollow portion becomes unnecessary. Therefore, the number of processes to manufacture a hollow molded product can be reduced and the production efficiency be improved accordingly.

BEST MODE FOR CARRYING OUT THE INVENTION

An embodiment of the valve gate-type injection molding method and apparatus according to the present invention is discussed in detail below.

Figure 1:
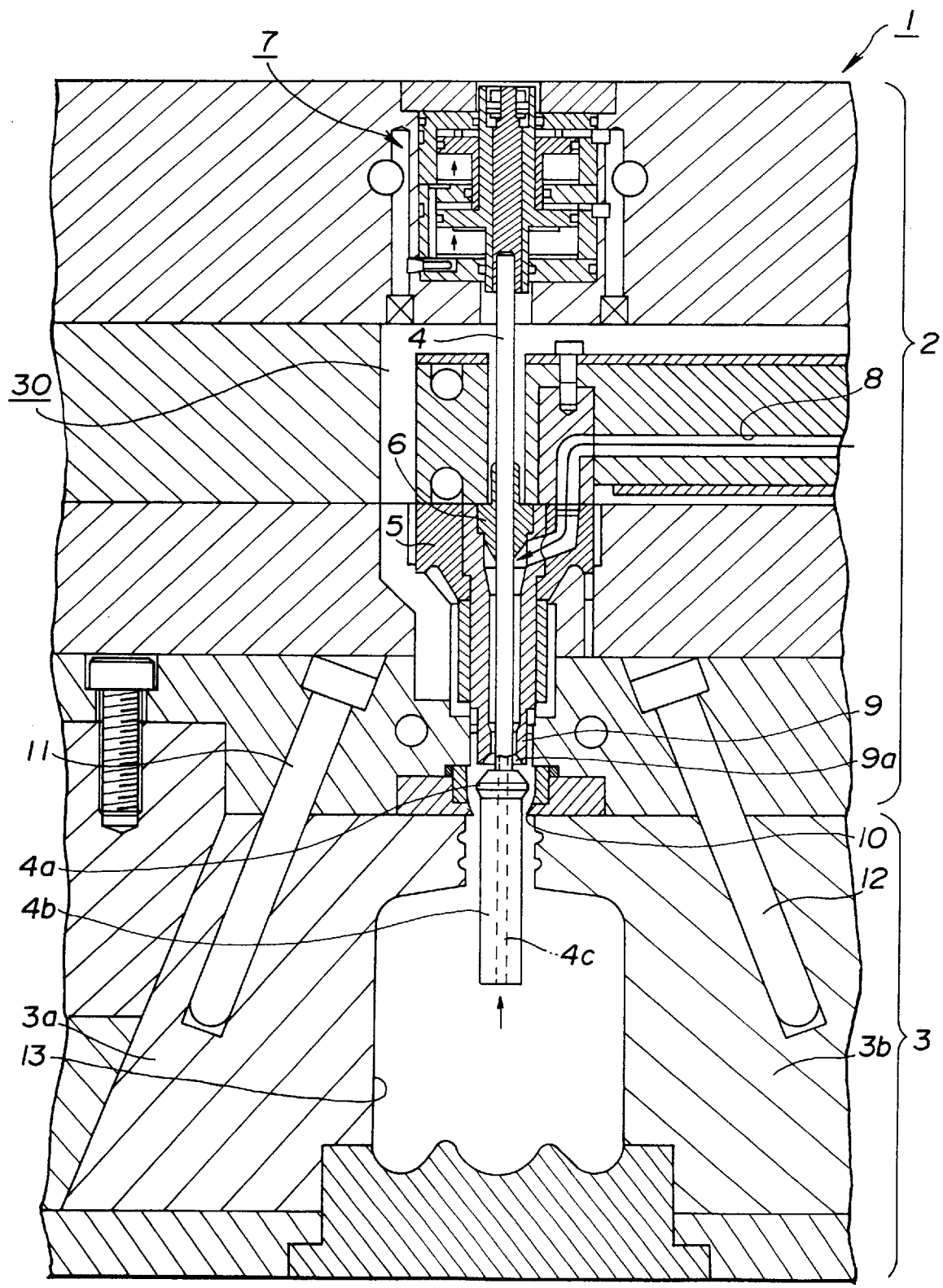
FIG. 1 is a general cross section of the valve gate-type injection molding apparatus for performing the valve gate-type injection molding operation according to the present invention.

FIG. 1 is a general cross section of the valve gate-type injection molding apparatus for performing the valve gate-type injection molding operation according to the present invention.

The valve gate-type injection molding apparatus 1 henceforth referred to simply as "the apparatus" is constituted of an upper mold 2, being stationary, and a lower mold 3, to move downward during release. A valve 30, to inject molten resin, is disposed in the upper mold 2.

The valve 30 is constituted of a valve pin 4, to open and close a date, discussed below; a body 5, to hold movably upwards and downwards the valve pin 4; and an air piston 7, to move the valve pin 4 a prescribed distance upwards and downwards along a guide bush 6 which is disposed inside the body 5.

Moreover, a manifold 8, to guide molten resin, which is under prepressure and heated and melted, is formed inside the body 5. The fore end of the manifold 8 reaches as far as a nozzle portion 9 formed on the tip end of the body 5.

The valve pin 4 is constituted from a valve element 4a, the cross section thereof in a rhombic form, which opens and closes a nozzle hole 9a formed on the nozzle portion 9 and opens and closes a gate 10 formed below that, and a cylindrical portion 4b formed to protrude from the end of the valve element 4a and having a diameter less than that of the gate 10.

The lower mold 3 is split from side to side and comprises a pair of mold halves 3a and 3b which can move downward along guide pins 11 and 12 respectively. A cavity 13, having the form of the exterior of a bottle with a small mouth, is formed inside the mold halves 3a and 3b. The cylindrical portion 4b of the valve pin 4 is inserted in its central portion.

Also, an air supply path 4c, to supply air from an air source, not shown, to the cavity 13, is formed in the central portion of the valve pin 4.

Figure 2:
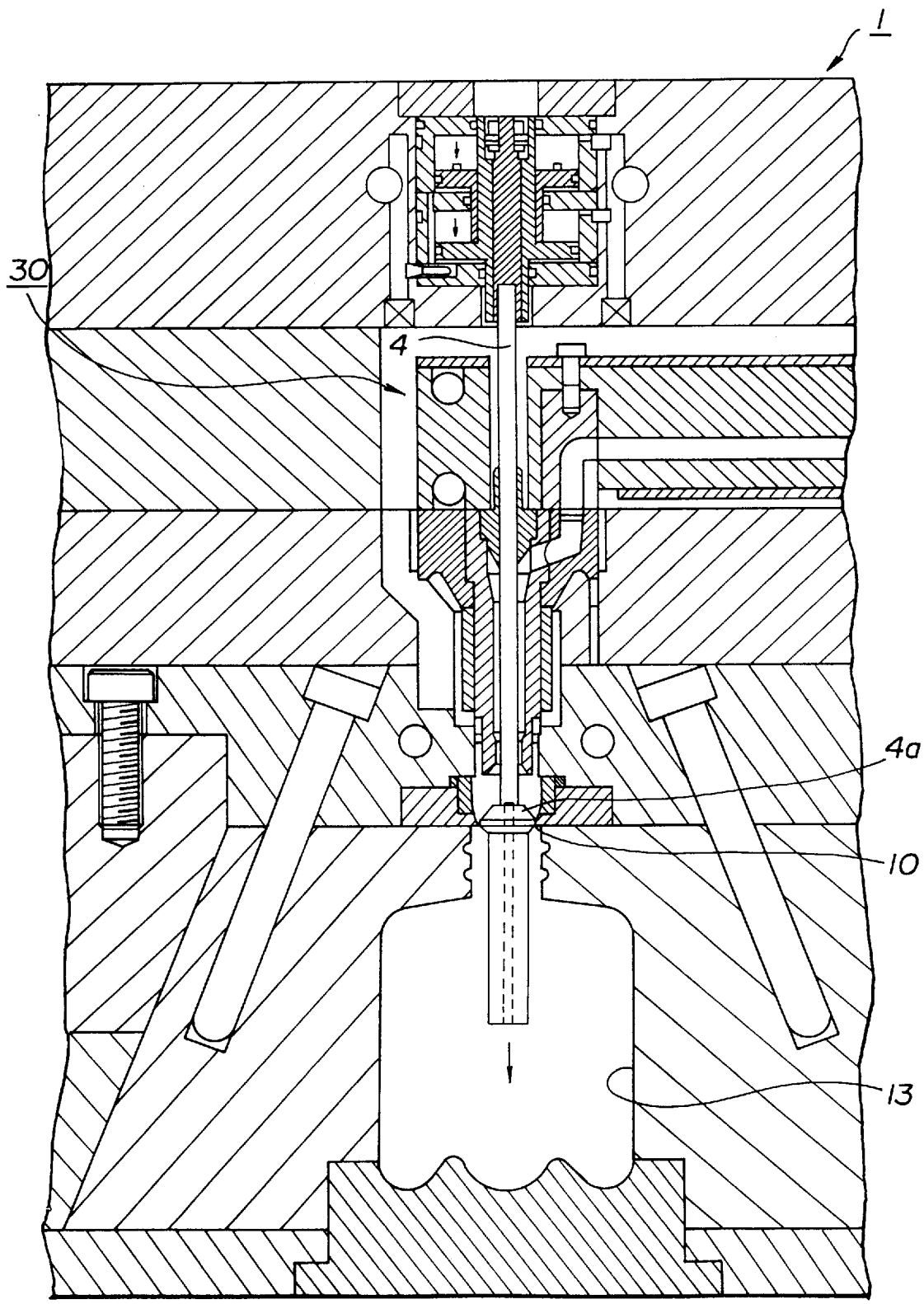
FIG. 2 is a general cross section of a valve gate injection molding apparatus showing the state where the valve pin is moved downwards.

With this structure of the valve 30, when the air piston 7 operates, the valve pin 4 moves to the injection position at which molten resin is injected in the cavity 13, as the valve pin 4 is moved upwards as shown in FIG. 1 and opens the nozzle hole 9a and gate 10 with its valve element 4a; and moves to the gate cut position at which injection of molten resin into the cavity 13 is cut off, as the valve pin 4 is moved downward and closes the gate 10 with its valve element 4a, as shown in FIG. 2, in which the same elements are shown with the same symbols as in FIG. 1.

Now, the valve gate-type injection molding method of this invention, by using the above-described valve gate-type injection molding apparatus 1, is explained. Concurrently, the structure of the valve gate-type injection molding apparatus 1 according to this invention, is explained in greater detail.

Figure 3:
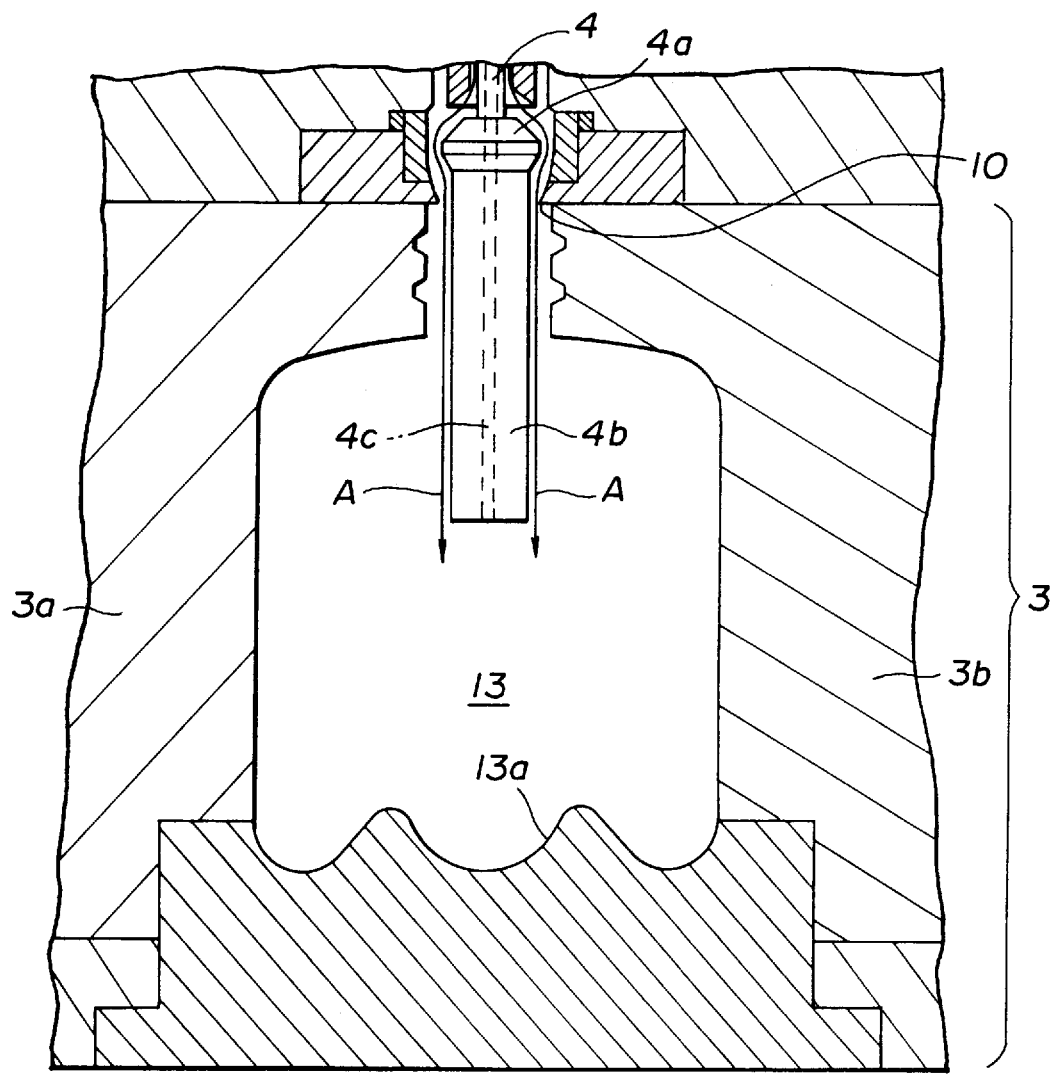
FIG. 3 is a cross section showing an enlargement of principal portions of FIG. 1.

FIG. 3 is a cross section showing an enlargement of principal portions of the valve gate-type injection molding apparatus 1, shown in FIG. 1. More particularly, FIG. 3 shows in detail the gate 10, formed by the upper mold 2 and the cavity 13, which is shaped like a small mouthed bottle and formed by the lower mold 3; the valve element 4a of the valve pin, which is inserted in both this gate 10 and the cavity 13; and the cylindrical portion 4b, extending from the lower section of the valve element 4a.

The position of the valve pin 4 shown in FIG. 3 corresponds to the position of the valve pin 4 shown in FIG. 1. The cylindrical portion 4b passes through the center of the gate 10 and is inserted in the center of the cavity 13.

Meanwhile, the bottom portion 13a, located directly beneath the cylindrical portion 4b, is the central portion of the bottom surface of this cavity 13 and is formed in a hemispherical shape.

According to the stopping position of this valve pin 4, the valve element 4a of the valve pin 4 moves upwards. Therefore, the gate 10 becomes open, specifically, a ring shaped gap is formed between the inner surface of the gate 10 and the outer surface of the cylindrical body 4b. It becomes possible to inject molten resin into the cavity 13 as shown by the arrow A from the ring shaped gap.

Figure 4:
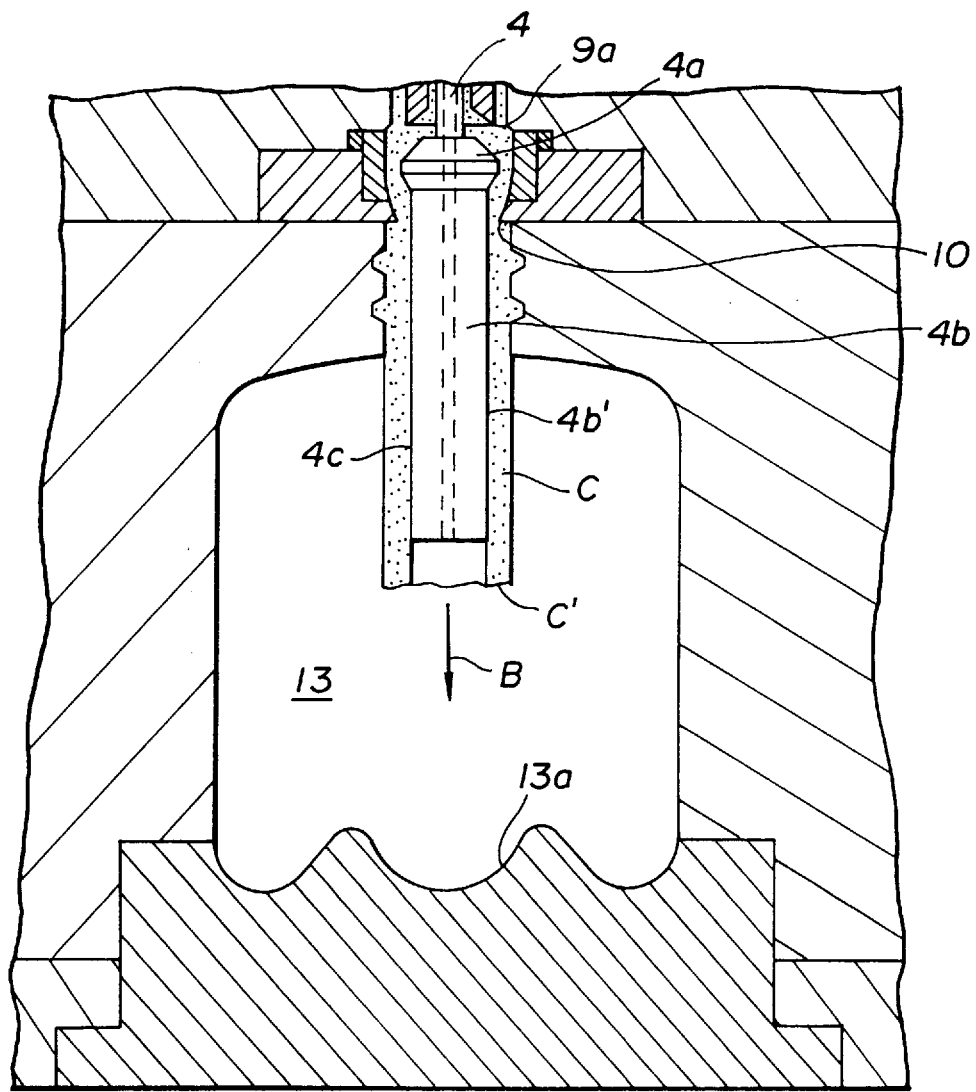
FIG. 4 is a general cross section to show the operation of the valve gate injection molding apparatus according to the present invention.

At the stopping position of the valve pin 4 shown in FIG. 3 discussed above, molten resin, which has been heated and melted, is guided by the manifold 8, shown in FIG. 1, to the valve hole 9a. Then the molten resin passes through the valve hole 9a and the gate 10; after that, the molten resin C drops downward along the outer surface 4b' of the cylindrical portion 4b, as shown by the arrow B in FIG. 4.

In this way, when the molten resin C drops downward along the outer surface 4b' of the cylindrical portion 4b, the tip end C' of the molten resin C eventually reaches the hemispherical bottom 13a of the cavity 13. The tip end C' of the molten resin C merges and joins together as shown in FIG. 5, thereby forming the hollow portion S between the cylindrical portion 4b of the valve pin 4 and the dropped molten resin C.

A weld line D is formed at the tip end C' of the molten resin C, which has merged at the bottom 1a of the cavity 13. There may occur a risk of insufficient strength at that spot. In order to eliminate this risk, the constitution may be such that a cylindrical depression 13b is formed at the central portion of the hemispherical bottom 13a of the cavity 13, concentrates the tip end C' of the molten resin C in the depression 13b, and prevents the formation of a weld line, as in FIG. 6, which shows a detail of principal elements of FIG. 5. Moreover, the cylindrical protrusion, formed by the molten resin C which penetrated this depression 13b may be cut off in post-processing.

Figure 5:
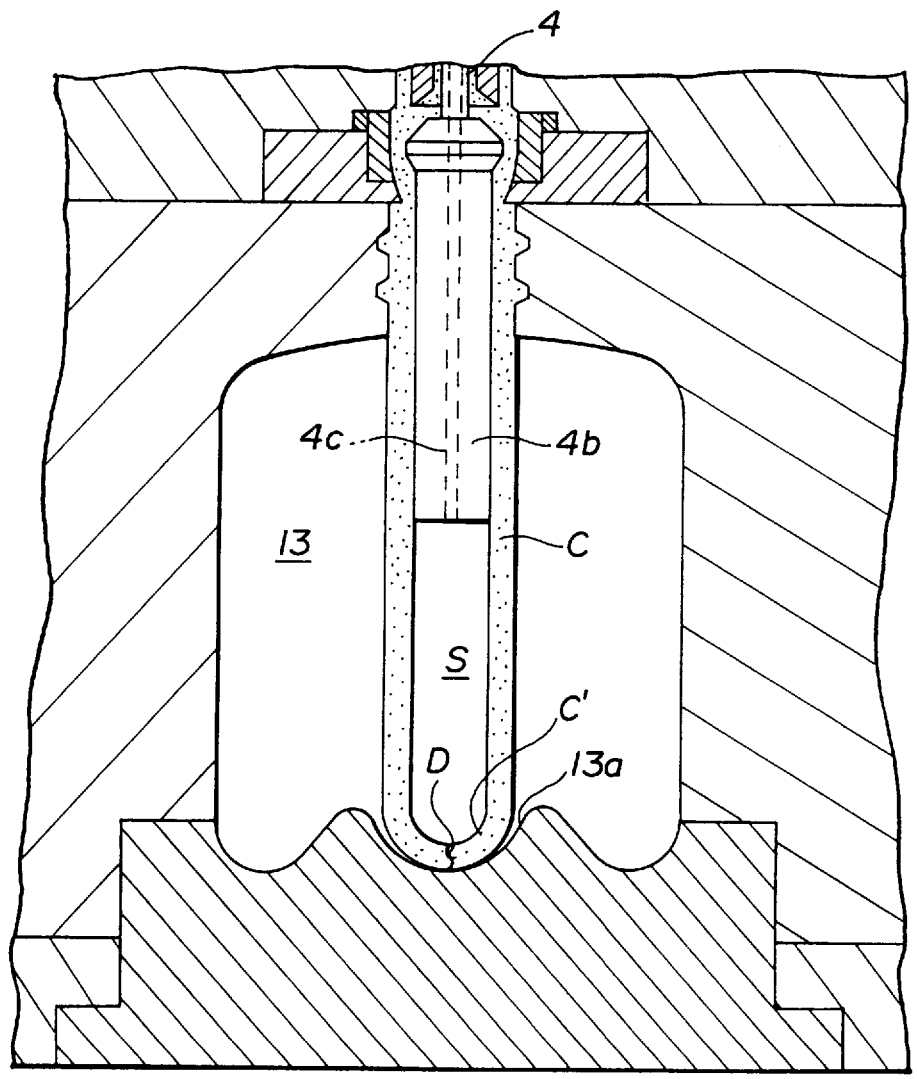
FIG. 5 is a general cross section to show the operation of the valve gate injection molding apparatus according to the present invention.
Figure 6:
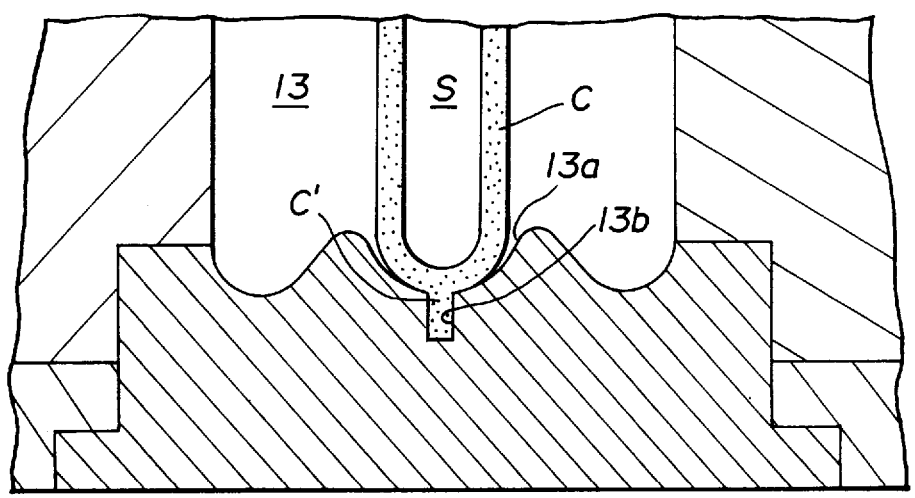
FIG. 6 is a general cross section to show another embodiment of the valve gate injection molding apparatus according to the present invention.

After the hollow portion S is formed between the cylindrical portion 4b of the valve pin 4 and the molten resin C which dropped, as shown in FIG. 5, the piston 7, shown in FIG. 1, operates and moves the valve pin 4 downward. Then the valve element 4a of the valve pin 4 is inserted in the gate 10 and interrupts the injection of molten resin to the cavity 13 gate cut as shown in FIG. 7, where the same elements as in FIG. 5 are shown with the same symbols.

Figure 7:
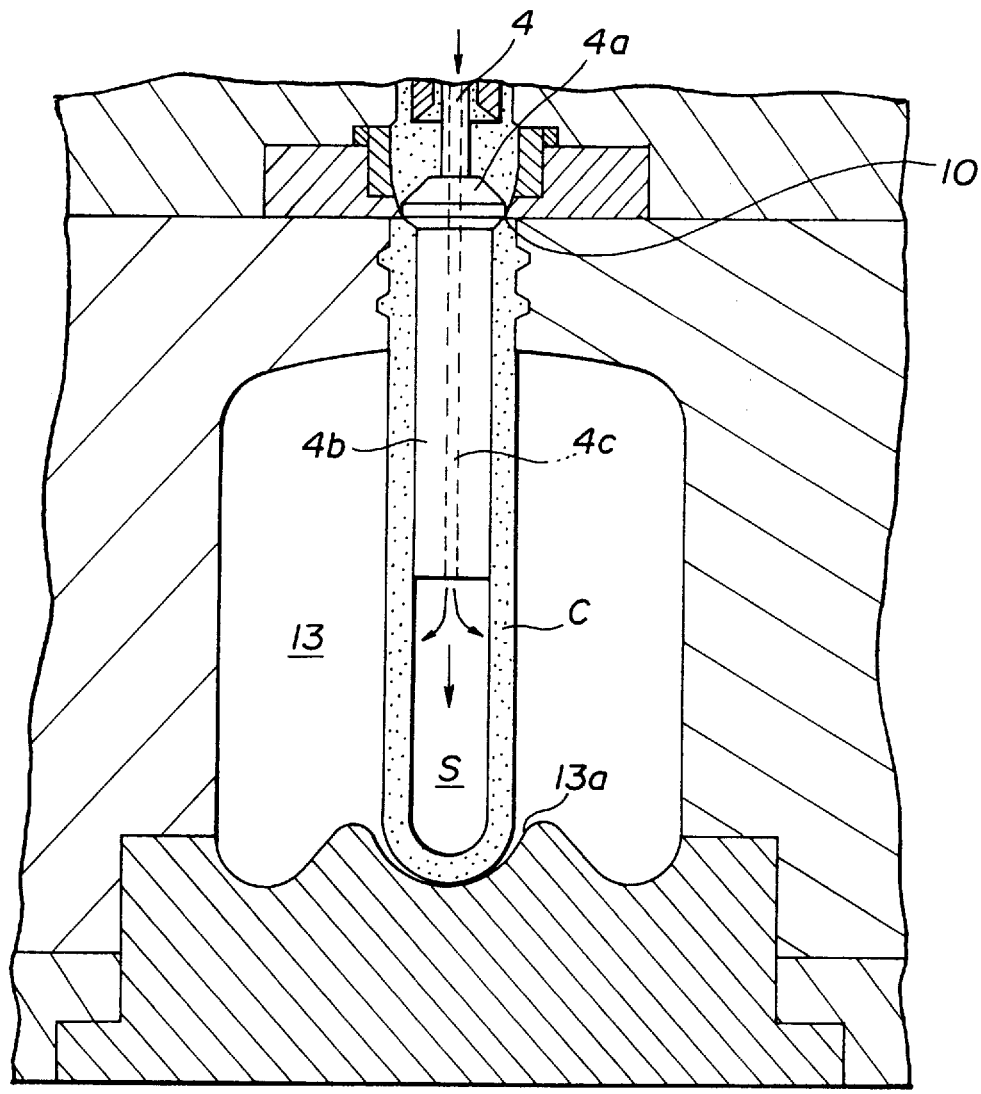
FIG. 7 is a general cross section to show the operation of the valve gate injection molding apparatus according to the present invention.

At the position of the valve pin 4 shown in FIG. 7, air is supplied inside the hollow portion S, as shown by the arrow, by way of the air supply path 4c from the air source, not shown. Then, this hollow portion S expands and the circumference thereof broadens due to the operation of the air; and the molten resin C, forming the hollow portion S as shown in FIG. 8, contacts to the inner surface of the bottle-shaped cavity 13.

Afterwards, when the supply of air is stopped and the lower mold 3 is cooled with a means for cooling, not shown, the molten resin C, contact to the inner surface of the cavity 13, is cooled and solidified.

Figure 8:
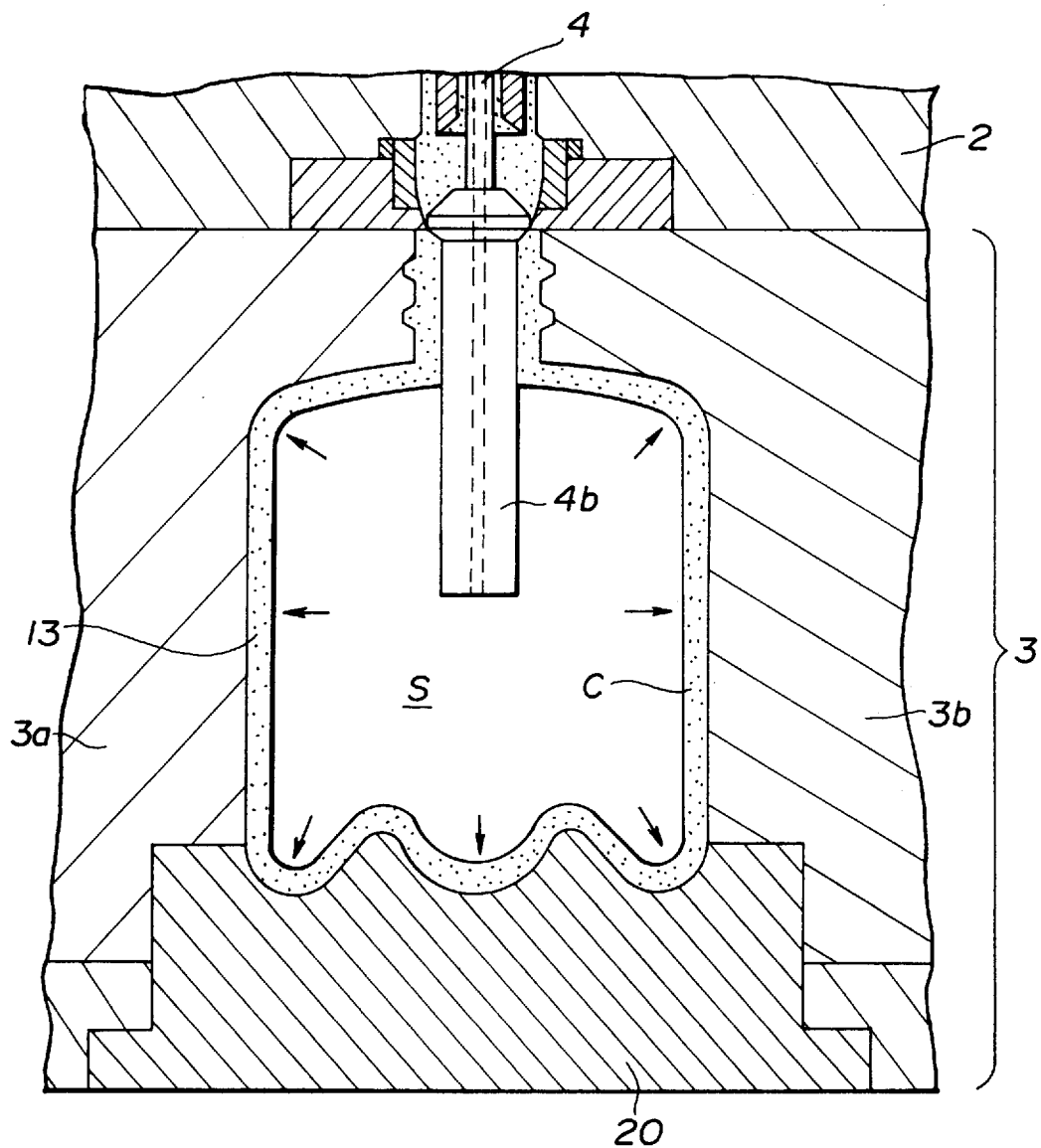
FIG. 8 is a general cross section to show the operation of the valve gate injection molding apparatus according to the present invention.
Figure 9:
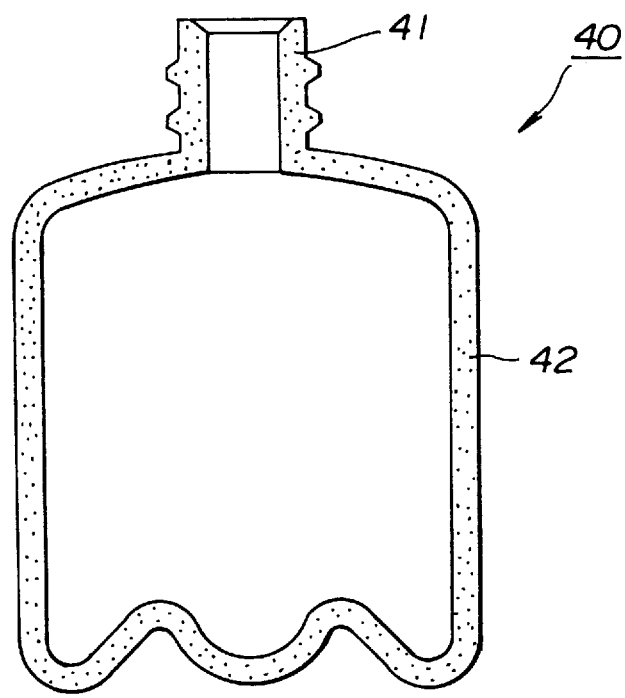
FIG. 9 is a cross section of a hollow molded product formed with the valve gate-type injection molding apparatus according to the present invention.

Next, the upper mold 2 and lower mold 3 shown in FIG. 8 are separated in a vertical direction and the cylindrical portion 4b of the valve pin 4 is removed from inside the cavity 13. Then the various molds, such as the pair of mold halves 3a and 3b to either side and bottom mold 20, forming the bottom of the cavity 13, are separated and the lower mold as a whole is opened. Whereupon, the bottle-shaped, hollow, molded product 40, in which the diameter of the mouth portion 41 considerably smaller than the body portion 42, is formed corresponding to the form of the inner surface of the cavity 13, as shown in FIG. 9.

Consequently, with the valve gate-type injection molding apparatus 1, discussed above, separable molds, comprising a cavity 13 corresponding to the exterior of the hollow molded product, may be prepared to form a hollow molded product. In particular, the number of parts of the entirety of the valve gate-type injection molding apparatus 1 can be greatly reduced because special molds are not required in order to form a hollow molded product. Also, the number of manufacturing processes for a hollow molded product can be greatly reduced and production efficiency can be improved as much as possible, because releasing operations for the molds, to form a hollow portion as before, become unnecessary.

Furthermore, if a apparatus equipped with a plurality of the valves 30 and cavities 13 is used, a different number of complex, hollow molded products can be attained than, for example, with regular blow molding, which is generally used in order to manufacture hollow molded products.

Moreover, molded products, formed with the valve gate-type injection molding method and apparatus 1 of the present invention, are not limited to the bottle-shaped, hollow molded product 40 and may be hollow molded products with a variety of shapes.

INDUSTRIAL APPLICABILITY

A valve gate-type injection molding method and apparatus, according to the present invention as discussed above, is appropriate for the manufacture of hollow molded products of synthetic resin, which requires the reduction of manufacturing costs and the improvement of production efficiency.

I claim:

1. A valve gate injection molding apparatus wherein molten resin is injected from a valve, in which the molten resin is held under pressure by way of a gate, into a cavity formed in a mold, and the cavity has a structure and arrangement so that the molten resin injected inside the cavity is cooled and solidified to attain a molded product of synthetic resin, the apparatus further comprising:

a valve pin, provided within the valve, for controlling the amount of molten resin injected from the valve, the valve pin comprising a valve body for opening and closing the gate, and a cylindrical portion extending insertably inside the cavity;

a bottom means, having a concave surface relative to a top of the cavity, for merging and closing a forwardmost end of the molten resin dropped by way of the gate along the surface of the cylindrical portion, said bottom means located in a portion of the mold defining the bottom of the cavity and said bottom means being located directly below but spaced from the cylindrical portion so as to form a hollow portion between the molten resin and the cylindrical portion upon merging and closing of said forwardmost end; and an air supply path, formed inside the valve pin, for blowing air into the hollow portion to inflate the hollow portion so as to be brought into contact to the inner surface of the cavity.

2. The valve gate injection molding apparatus according to claim 1, wherein the bottom means has a cylindrical depression means in a central portion thereof for increasing strength of the merged and closed forwardmost end of the molten resin.

3. The valve gate injection molding apparatus according to claim 1, wherein the valve pin has opening means for passing the air downward directly toward the concave surface of the bottom means.

4. The valve gate injection molding apparatus according to claim 1, wherein the bottom means is made of a single molding part.

5. A method for valve gate injection molding which comprises:

injecting a molten resin under pressure through a nozzle about a valve and through a gate into a mold cavity, and cooling and solidifying the molten resin injected inside the mold cavity in a form corresponding to the mold cavity, and further including:

moving a valve pin into the mold cavity relative to the gate for controlling an amount of the molten resin injected from the nozzle, the valve pin is installed within the valve and has a surface projecting into the mold cavity and a bottom with a tip end;

sliding the molten resin inside the mold cavity along the surface of the valve pin and dropping the molten resin onto a concave surface of a bottom of the mold cavity;

merging a forwardmost end of the dropping molten resin at the bottom of the mold cavity by action of the molten resin on the concave surface thereby forming the dropped molten resin into a closed hollow portion; and blowing air into the closed hollow portion from the tip end of the valve pin to inflate the closed hollow portion so that the molten resin contacts an inner surface of the mold cavity.

6. The method for valve gate injection molding according to claim 5, wherein the air is passed through an opening in the tip end of the valve pin and directed downward directly toward the concave surface of the bottom of the mold cavity.

7. The method for valve gate injection molding according to claim 5, wherein the bottom of the mold cavity is made of a single molding part.

* * * * *